(12) United States Patent
Fan et al.

(10) Patent No.: US 11,491,677 B2
(45) Date of Patent: Nov. 8, 2022

(54) RETRACTION DEVICE AND FEED MECHANISM HAVING THE SAME

(71) Applicant: Leica Microsystems Ltd., Shanghai, Shanghai (CN)

(72) Inventors: Zheguang Fan, Shanghai (CN); Xiang Liang, Shanghai (CN); Gang Zhou, Shanghai (CN)

(73) Assignee: Leica Microsystems Ltd., Shanghai, Shanghai (CN)

( * ) Notice: Subject to any disclaimer, the term of this patent is extended or adjusted under 35 U.S.C. 154(b) by 174 days.

(21) Appl. No.: 16/765,504

(22) PCT Filed: Nov. 27, 2018

(86) PCT No.: PCT/CN2018/117727
§ 371 (c)(1),
(2) Date: May 20, 2020

(87) PCT Pub. No.: WO2019/105348
PCT Pub. Date: Jun. 6, 2019

(65) Prior Publication Data
US 2020/0316805 A1 Oct. 8, 2020

(30) Foreign Application Priority Data

Nov. 30, 2017 (CN) .......................... 201711236083.4

(51) Int. Cl.
*B26D 7/06* (2006.01)
*G01N 1/06* (2006.01)
(52) U.S. Cl.
CPC ................ *B26D 7/06* (2013.01); *G01N 1/06* (2013.01); *G01N 2001/065* (2013.01)

(58) Field of Classification Search
CPC .......... B26D 7/06; B26D 7/0616; B26D 1/38; B26D 7/24; B26D 7/01; B26D 7/2614;
(Continued)

(56) References Cited

U.S. PATENT DOCUMENTS 3,534,647 A * 10/1970 Mills ....................... B27B 13/10
83/820
3,564,961 A * 2/1971 Burkhardt ................ G01N 1/06
83/412
(Continued)

FOREIGN PATENT DOCUMENTS

CN 201161405 Y 12/2008
CN 103134704 A 6/2013
(Continued)

*Primary Examiner* — Ghassem Alie
(74) *Attorney, Agent, or Firm* — Hodgson Russ LLP

(57) ABSTRACT

A retraction device includes: a spindle, a support plate and a plurality of spring washers. The spindle is movable along an axis direction thereof and has a first end; a support plate has a fixed position, the first end of the spindle penetrates the support plate; and the plurality of spring washers are fitted over the first end of the spindle and stacked together in an identical direction. The plurality of spring washers are compressed between the spindle and the support plate with a predetermined pre-load. The spindle is configured to be switchable between a first position and a second position, and capable of moving a predetermined distance relative to the support plate in the axis direction of the spindle during switching. When in the first position, the spindle is farthest from the support plate, when in the second position, the spindle is closest to the support plate.

20 Claims, 2 Drawing Sheets

(58) Field of Classification Search
CPC .............. A61B 10/096; A61B 10/0275; A61B 2010/0225; G01N 2001/065; G01N 1/06; G01N 2001/061; Y10T 83/87; Y10T 83/6492; Y10T 83/6548; Y10T 83/6566; Y10T 83/6544; Y10T 83/647; Y10T 83/6496
USPC ... 83/109, 530, 703, 410.8, 414, 915.5, 397, 83/411.1, 412, 465, 544, 648, 411.3, 72, 83/356.2, 418, 425, 707, 715, 716, 717, 83/718, 729, 730, 409.2, 563
See application file for complete search history.

(56) References Cited

U.S. PATENT DOCUMENTS

| | | | |
|---|---|---|---|
| 4,594,929 A * | 6/1986 | Behme | G01N 1/06 83/412 |
| 4,967,629 A * | 11/1990 | Behme | G01N 1/06 83/414 |
| 5,161,446 A * | 11/1992 | Holbl | B26D 1/38 83/410.8 |
| 6,601,488 B1 | 8/2003 | Muse et al. | |
| 9,032,854 B2 * | 5/2015 | Yang | G01N 1/06 83/715 |
| 2009/0235799 A1 | 9/2009 | Thiem | |
| 2012/0247297 A1 * | 10/2012 | Kawaguchi | B26D 5/005 83/375 |
| 2013/0186248 A1 * | 7/2013 | Heid | G01N 1/06 83/530 |

FOREIGN PATENT DOCUMENTS

| | | |
|---|---|---|
| CN | 205255114 U | 5/2016 |
| CN | 107351164 A | 11/2017 |

\* cited by examiner

RETRACTION DEVICE AND FEED MECHANISM HAVING THE SAME

CROSS-REFERENCE TO RELATED APPLICATIONS

The present application is a national phase entry under 35 USC § 371 of International Application PCT/CN2018/117727, filed Nov. 27, 2018, which claims the benefit of and priority to Chinese Patent Application No. 201711236083.4, filed Nov. 30, 2017, the entire disclosure of which is incorporated herein by reference.

FIELD

The present disclosure relates to a technical field of microtomes, and more particularly to a retraction device and a feeding mechanism having the same.

BACKGROUND

In a rotary microtome of the related art, the rotary microtome usually includes an object carriage for carrying a specimen holder which holds a specimen to be cut. The object carriage moves up and down in a vertical path of the rotary microtome. During the vertical movement, the specimen passes through a cutter fixedly arranged on the rotary microtome from an upper position to complete one section. After one section, the specimen holder is located under the cutter.

When the specimen is moved back to the upper position, its surface will hit the cutter and the specimen may be damaged. Therefore, a micro feeding mechanism for the rotary microtome has a retraction device. The function is realized by a pair of spring washers and a pull rod. When retraction is needed, the pull rod is pulled to pull the feeding mechanism back, and when the retraction is not needed, the pull rod is released, such that the feeding mechanism is moved to an original position by the pair of spring washers. The micro feeding mechanism in the related art refers to that the micro feeding mechanism can drive the specimen to feed 0.1 μm to 100 μm by turning a handwheel one circle.

In general, the pair of spring washers are usually arranged face-to-face and have low rigidity, such that the micro feeding mechanism does not have good rigidity. The micro feeding mechanism will vibrate when cutting a hard material or cutting at a high speed, and thus the quality of the section will not be good enough.

SUMMARY

A retraction device for a feeding mechanism of a rotary microtome according to embodiments of the present disclosure includes: a spindle movable along an axis direction thereof and having a first end; a support plate having a fixed position, the first end penetrating the support plate; and a plurality of spring washers fitted over the first end and stacked together in an identical direction. The plurality of spring washers are compressed between the spindle and the support plate with a predetermined pre-load. The spindle is configured to be switchable between a first position and a second position, and capable of moving a predetermined distance relative to the support plate in the axis direction of the spindle during switching. When in the first position, the spindle is farthest from the support plate, and when in the second position, the spindle is closest to the support plate.

A retraction device for a feeding mechanism of a rotary microtome according to embodiments of the present disclosure includes: a support plate; a spindle movable along an axis direction thereof and having a first end penetrating the support plate; and a plurality of spring washers fitted over the first end and compressed between the spindle and the support plate with a predetermined pre-load. The spindle is switchable between a first position in which the spindle is farthest from the support plate, and a second position in which the spindle is closest to the support plate; an inner ring of each of the plurality of spring washers has an identical protruding direction.

A feeding mechanism according to the present disclosure includes an object carriage, a first slide base, a second slide base and a retraction device. The retraction device includes: a spindle movable along an axis direction thereof and having a first end; a support plate having a fixed position, the first end penetrating the support plate; and a plurality of spring washers fitted over the first end and stacked together in an identical direction. The plurality of spring washers are compressed between the spindle and the support plate with a predetermined pre-load. The spindle is configured to be switchable between a first position and a second position, and capable of moving a predetermined distance relative to the support plate in the axis direction of the spindle during switching. When in the first position, the spindle is farthest from the support plate, and when in the second position, the spindle is closest to the support plate. The object carriage is slidably connected to the first slide base, the first slide base is slidably connected to the second slide base, and the second slide base has a fixed position. A second end of the spindle of the retraction device is connected to the object carriage, and configured to drive the object carriage to retract the predetermined distance relative to the first slide base in the axis direction of the spindle.

DETAILED DESCRIPTION

The embodiments of the present disclosure are described below with reference to the accompanying drawings. It should be noted that terms "up", "down", "left", "right", "front", "rear" and similar expressions used herein are only for the purpose of explanation, and cannot be construed as the limitation of the present disclosure.

The present disclosure relates to a retraction device for a feeding mechanism of a rotary microtome, including: a spindle movable along an axis direction thereof and having a first end; a support plate having a fixed position, the first end penetrating the support plate; and a plurality of spring washers fitted over the first end and stacked together in an identical direction. The plurality of spring washers are compressed between the spindle and the support plate with a predetermined pre-load. The spindle is configured to be switchable between a first position and a second position, and capable of moving a predetermined distance relative to the support plate in the axis direction of the spindle during switching. When in the first position, the spindle is farthest from the support plate, when in the second position, the spindle is closest to the support plate.

Figure 1:
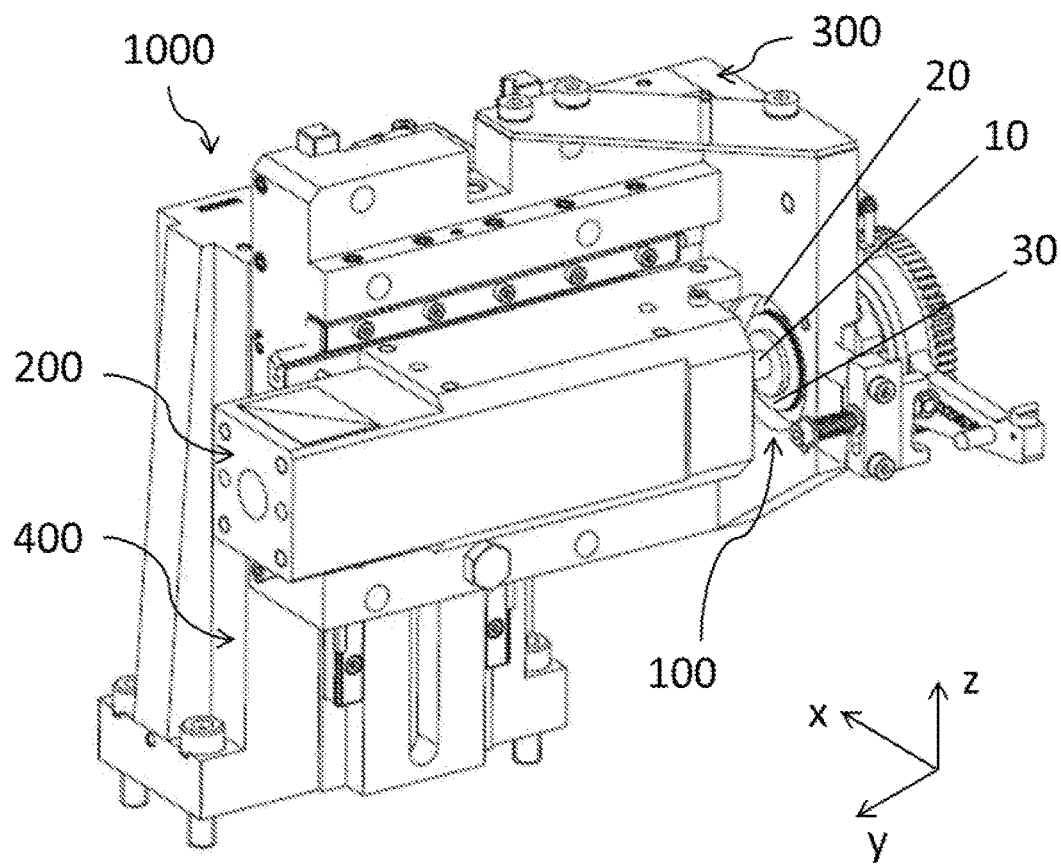
FIG. 1 is a schematic view of a retraction device and a feeding mechanism according to an embodiment of the present disclosure.
Figure 2:
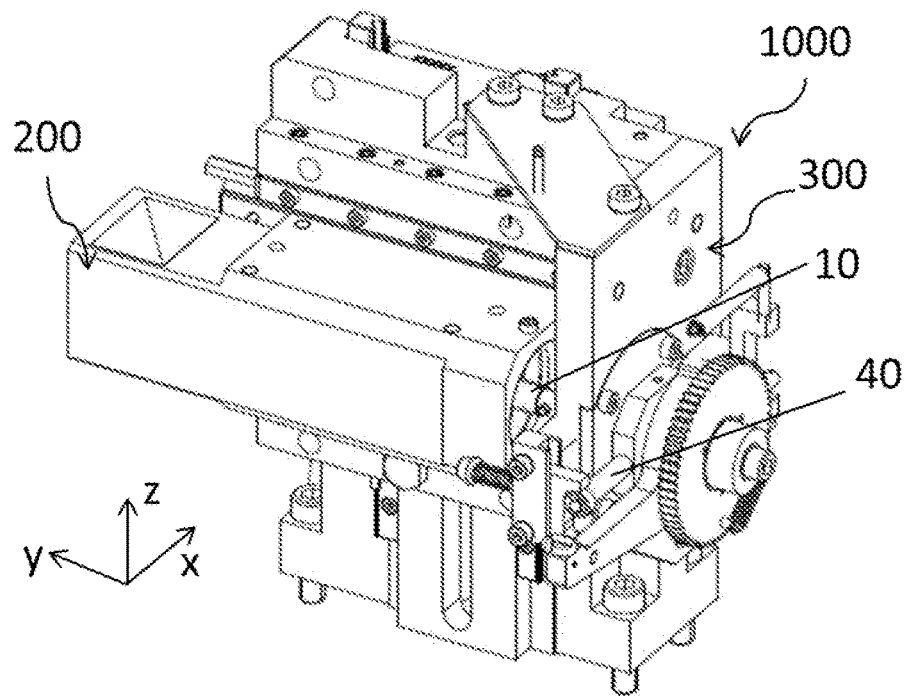
FIG. 2 is another schematic view of a retraction device and a feeding mechanism according to an embodiment of the present disclosure.
Figure 3:
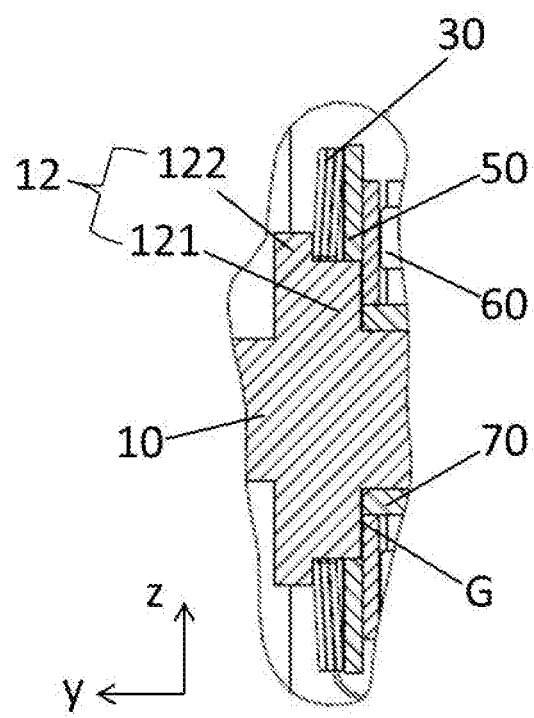
FIG. 3 is a partial sectional view of a retraction device according to an embodiment of the present disclosure.

FIGS. 1 and 2 illustrate perspective views of a retraction device 100 and a feeding mechanism 1000 according to the embodiment of the present disclosure, and FIG. 3 illustrates a partial sectional view of the retraction device 100 according to the embodiment of the present disclosure.

In FIGS. 1-3, in order to facilitate the description and the orientation, orthogonal XYZ axes are illustrated. A positive direction of X axis is a left direction, while a negative direction of X axis is a right direction; a positive direction of Y axis is a front direction, while a negative direction of Y axis is a rear direction; a positive direction of Z axis is an up direction, while a negative direction of X axis is a down direction.

As illustrated in FIG. 1, the retraction device 100 for the feeding mechanism of the rotary microtome according to the embodiment of the present disclosure includes a spindle 10, a support plate 20 and a plurality of spring washers 30.

The spindle 10 is movable along an axis direction thereof. The position of the support plate 20 is fixed, and a first end of the spindle 10 penetrates the support plate 20. The plurality of spring washers 30 are fitted over the first end of the spindle 10 and stacked together in an identical direction, and the plurality of spring washers 30 are compressed between the spindle 10 and the support plate 20 with a predetermined pre-load. It should be noted that the position of the support plate 20 being fixed means that the support plate 20 is arranged in a fixed position relative to the spindle 10 and the plurality of spring washers 30, such that the support plate 20 can support the spindle 10 and the plurality of spring washers 30. The plurality of spring washers 30 being stacked together in the identical direction means that the plurality of spring washers are oriented in the identical direction and abutted against each other, rather than arranged face-to-face. Besides, the first end of the spindle 10 refers to a rear end illustrated in FIG. 1.

The spindle 10 is switchable between a first position and a second position, and can move a predetermined distance relative to the support plate 20 in the axis direction of the spindle 10 during switching. In some embodiments, when in the first position, the spindle 10 is farthest from the support plate 20. When pulled, the spindle 10 can compress the plurality of spring washers 30, and the spindle 10 can be moved the predetermined distance towards the support plate 20 to the second position along the axis direction of the spindle 10. When in the second position, the spindle 10 is closest to the support plate 20. When released, the spindle 10 moves the predetermined distance away from the support plate 20 to the first position along the axis direction of the spindle 10 under the effect of elastic restoring force of the plurality of spring washers 30, thus realizing the retraction and release of the retraction device 100. In some embodiments, the axis direction of the spindle 10 refers to a front-and-rear direction illustrated in FIG. 1.

It could be understood by those skilled in the related art that the spindle 10 can rotate around the axis direction of the spindle 10 to drive the micro feed of the feeding mechanism 1000. In contrast, the retraction device 100 moves the spindle 10 along the axis direction of the spindle 10 to drive the feeding mechanism 1000 to retract and release in a small range.

The support plate 20 defines an opening (not illustrated), and a part of the first end of the spindle 10 protrudes from the opening. The plurality of spring washers are fitted over the first end of the spindle 10, that is, an inner diameter of each spring washer 30 is greater than a diameter of the first end of the spindle 10. In addition, an outer diameter of each spring washer 30 is greater than the diameter of the opening, such that the plurality of spring washers 30 can be abutted against the support plate 20.

As illustrated in FIG. 2, the retraction device 100 also includes a pull rod 40, and the pull rod 40 is connected to the first end of the spindle 10, such that the retraction device 100 can be operated. In some embodiments, the pull rod 40 is located at a side of the support plate 20 away from the spindle 10, such that the retraction device 100 can be easily accessed and operated. Further, the pull rod 40 may be connected to the first end of the spindle 10 in a direction perpendicular to the axis direction of the spindle 10, such that the retraction device 100 can be operated more lightly.

As illustrated in FIG. 3, three spring washers 30 are provided, such that the rigidity of the retraction device 100 in the first position along the axis direction of the spindle 10 is enhanced and the elastic force of the plurality of spring washers 30 is suitable when the spindle 10 moves to the second position, which is conducive for the operation of the retraction device 100.

Each spring washer 30 may be a disc spring washer, and an inner ring of each disc spring washer has an identical protruding direction. That is, a plurality of disc spring washers are arranged in the identical direction and stacked together, such that a force of the plurality of spring washers 30 on the spindle 10 is more uniform, and the rigidity of the retraction device 100 in the first position along the axis direction of the spindle 10 can be further enhanced. Further, the protruding direction of the inner ring of each disc spring washer is directed from the support plate 20 to the spindle 10, which is conductive for the spindle 10 to restore from the second position to the first position.

The first end of the spindle 10 is provided with a flange 12, and the plurality of spring washers 30 are compressed between the spindle 10 and the support plate 20 by the flange 12. In some embodiments, the flange 12 includes a first flange 121 and a second flange 122, the plurality of spring washers 30 are fitted over the first flange 121 and abut against the second flange 122. That is, an outer diameter of the first flange 121 is smaller than the inner diameter of each spring washer 30, and an outer diameter of the second flange 12 is greater than the inner diameter of each spring washer 30 and smaller than an outer diameter of each spring washer 30, thus ensuring the support for the plurality of spring washers 30 and saving materials.

A gap G may be defined between an end face of the flange 12 adjacent to the support plate 20 and the support plate 20, and the gap G is greater than or equal to the predetermined distance that the spindle 10 can move during switching between the first position and the second position, such that the movement of the spindle 10 along the axis direction of the spindle 10 is not interfered. In some embodiments, a flat washer 50 may also be arranged between the plurality of spring washers 30 and the support plate 20, and the flat washer 50 is fitted over the first flange 121, so as to increase a contact area and facilitate defining the gap G. Further, along the axis direction of the spindle 10, a sum of a thickness of the plurality of spring washers 30 in the first position and a thickness of the flat washer 50 is greater than a thickness of the first flange 121, thus defining the gap G.

A plane bearing 60 may be disposed between the plurality of spring washers 30 and the support plate 20, and thus the plurality of spring washers 30 may rotate with the spindle 10, such that the retraction device 100 does not affect the rotation of the spindle 10. That is, the spindle 10 can rotate to drive the micro feed of the micro feeding mechanism 1000. In some embodiments, the plane bearing 60 is arranged between the flat washer 50 and the support plate 20, and is fitted over the first end of the spindle 10 through a spindle sleeve 70. Thus, the spindle 10 can rotate around the axis direction thereof and move along the axis direction thereof.

Referring to FIGS. 1 and 2, the feeding mechanism 1000 for the rotary microtome according to the embodiment of the present disclosure includes an object carriage 200, a first slide base 300, a second slide base 400 and a retraction device 100 according to the above embodiments.

The object carriage 200 is slidably connected to the first slide base 300, the first slide base 300 is slidably connected to the second slide base 400, and the second slide base 400 has a fixed position. A second end of the spindle 10 of the retraction device 100 is connected to the object carriage 200, and configured to drive the object carriage 200 to retract the predetermined distance relative to the first slide base 300 in the axis direction of the spindle 10. In some embodiments, the object carriage 200 is slidable in the front-and-rear direction relative to the first slide base 300, and the first slide base 300 is slidable in an up-and-down direction relative to the second slide base 400. It should be noted that the second slide base 400 having a fixed position means that the second slide base 400 is arranged in a fixed position relative to the first slide base 300, the object carriage 200 and the retraction device 100, so as to be able to support these components.

In addition, the support plate 20 may be fixedly connected to or integrally formed with the first slide base 300. Thus, the retraction device 100 can be stably supported by the first slide base 300.

It may be understood that other structures and principles of the feeding mechanism 1000 are accessible for those skilled in the related art, which will not be repeated herein.

The working process of the retraction device 100 according to the embodiment of the present disclose is described as follows.

During a section process of a rotary microtome, the feeding mechanism 1000 drives a specimen to pass through a blade (not illustrated) from top to bottom to complete one section. After the one section, the object carriage 200 carried with specimen is located at a position below the blade. During the specimen moves upward to a position above the blade, in order to avoid the blade hitting the specimen surface, the pull rod 40 may be pulled to drive the spindle 10 to compress the plurality of spring washers 30 to deform, such that the spindle 10 can move a predetermined distance away from the blade from the first position to the second position along the axis of the spindle 10, and drive the object carriage 200 away from the blade. At this time, the first slide base 300 is driven to slide upward, and the object carriage 200 carried with the specimen is moved back to the position above the blade. The pull rod 40 may be released, and under the effect of elastic restoring force, the plurality of spring washers 30 push the spindle 10 to move toward the blade from the second position back to the first position along the axis of the spindle 10. Thus, the rotary microtome can continue for section.

In some embodiments, as illustrated in FIGS. 1 and 2, the retraction device 100 according to embodiments of the present embodiment includes: a spindle 10 movable along an axis direction thereof and having a first end; a support plate 20 having a fixed position, the first end of the spindle 10 penetrating the support plate 20; and a plurality of spring washers 30 fitted over the first end of the spindle 10 and stacked together in an identical direction. The plurality of spring washers 30 are compressed between the spindle 10 and the support plate 20 with a predetermined pre-load. The spindle 10 is configured to be switchable between a first position and a second position, and capable of moving a predetermined distance relative to the support plate 20 in the axis direction of the spindle 10 during switching. When in the first position, the spindle 10 is farthest from the support plate 20, and when in the second position, the spindle 10 is closest to the support plate 20.

In the retraction device 100 and the feeding mechanism 1000 according to the embodiment of the present disclosure, the retraction device 100 has a relatively high rigidity due to the arrangement of the plurality of spring washers 30 stacked in the identical direction, which can effectively reduce the vibration and improve the quality of the section when cutting a hard material or cutting at a high speed.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" means two or more than two, unless specified otherwise.

In the present disclosure, unless specified otherwise, terms "mounted", "coupled" "connected", "fixed" and the like are used broadly. For example, fixed connections, detachable connections, or integral connections; may also be mechanical or electrical connections or direct connections, or indirect connections via intervening structures; may also be inner communications or interactions of two elements, which can be understood by those skilled in the art according to specific situations.

In the descriptions of the present disclosure, it should be noted that, unless otherwise expressly specified and limited, the first feature "on" or "under" the second feature may be that the first and second features are in direct contact, or that the first and second features are in indirect contact through an intermediate medium. Moreover, the first feature "on", "above" and "on top of" the second feature may be that the first feature is directly above or obliquely above the second feature, or merely be that the first feature has a level higher than the second feature. The first feature "down", "below", "under" and "on bottom of" the second feature may be that the first feature is directly below or obliquely below the second feature, or merely be that the first feature has a level less than the second feature.

Reference throughout this specification to terms "an embodiment," "some embodiments," "an example", "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

Although embodiments of the present disclosure have been illustrated and described above, it should be understood that the above embodiments are illustrative and cannot be construed to limit the present disclosure, and that those skilled in the art may change, modify, alternate and vary the above embodiments within the scope of the present disclosure.

What is claimed is:

1. A retraction device for a feeding mechanism of a rotary microtome, comprising:
a spindle movable along an axis direction thereof and having a first end, wherein the spindle moves relative to a cutter of the rotary microtome; a support plate having a fixed position,
the first end penetrating the support plate; and
a plurality of spring washers fitted over the first end and stacked together in an identical direction, and the plurality of spring washers being compressed between the spindle and the support plate with a predetermined pre-load,
wherein the spindle is configured to be switchable between a first position and a second position, and capable of moving a predetermined distance relative to the support plate in the axis direction of the spindle during switching, when in the first position, the spindle is farthest from the support plate, when in the second position, the spindle is closest to the support plate,
wherein a plane bearing is disposed between the plurality of spring washers and the support plate; and the plane bearing is fitted over the first end of the spindle through a spindle sleeve.

2. The retraction device according to claim 1, wherein the support plate defines an opening, and a part of the first end protrudes from the opening.

3. The retraction device according to claim 2, wherein an outer diameter of each spring washer is greater than a diameter of the opening, such that the plurality of spring washers are capable of abutting against the support plate.

4. The retraction device according to claim 1, wherein the pull rod is located at a side of the support plate away from the spindle.

5. The retraction device according to claim 1, wherein the pull rod is connected to the first end in a direction perpendicular to the axis direction of the spindle.

6. The retraction device according to claim 1, wherein three spring washers are provided.

7. The retraction device according to claim 1, wherein each spring washer is a disc spring washer, and an inner ring of each disc spring washer has an identical protruding direction.

8. The retraction device according to claim 7, wherein the protruding direction of the inner ring of each disc spring washer is directed from the support plate to the spindle.

9. The retraction device according to claim 1, wherein the first end is provided with a flange, and the plurality of spring washers are compressed between the spindle and the support plate by the flange.

10. The retraction device according to claim 9, wherein a gap is defined between an end face of the flange adjacent to the support plate and the support plate, and the gap is greater than or equal to the predetermined distance that the spindle is capable of moving during switching between the first position and the second position.

11. The retraction device according to claim 10, wherein the flange comprises a first flange and a second flange, the plurality of spring washers are fitted over the first flange and abut against the second flange.

12. The retraction device according to claim 11, wherein a flat washer is arranged between the plurality of spring washers and the support plate, and the flat washer is fitted over the first flange.

13. The retraction device according to claim 12, wherein along the axis direction of the spindle, a sum of a thickness of the plurality of spring washers in the first position and a thickness of the flat washer is greater than a thickness of the first flange.

14. The retraction device according to claim 1, wherein an inner diameter of each spring washer is greater than a diameter of the first end.

15. The retraction device according to claim 1,
wherein the cutter is fixedly arranged on the microtome; and the microtome further comprises an object carriage configured to carry a specimen holder holding a specimen and move up and down in a vertical path of the microtome, to pass through the cutter from an upper position for one section,
wherein the retraction device is connected to the object carriage, and configured to drive the object carriage to retract the predetermined distance in the axis direction of the spindle.

16. A feeding mechanism for a rotary microtome, comprising:
an object carriage, a first slide base, a second slide base and a retraction device comprising:
a spindle movable along an axis direction thereof and having a first end, wherein the spindle moves relative to a cutter of the rotary microtome; a support plate having a fixed position,
the first end penetrating the support plate; and
a plurality of spring washers fitted over the first end and stacked together in an identical direction, and the plurality of spring washers being compressed between the spindle and the support plate with a predetermined pre-load,
wherein the spindle is configured to be switchable between a first position and a second position, and capable of moving a predetermined distance relative to the support plate in the axis direction of the spindle during switching, when in the first position, the spindle is farthest from the support plate, when in the second position, the spindle is closest to the support plate,
wherein the object carriage is slidably connected to the first slide base, the first slide base is slidably connected to the second slide base, and the second slide base has a fixed position; a second end of the spindle of the retraction device is connected to the object carriage, and configured to drive the object carriage to retract the predetermined distance relative to the first slide base in the axis direction of the spindle,
wherein a plane bearing is disposed between the plurality of spring washers and the support plate; and the plane bearing is fitted over the first end of the spindle through a spindle sleeve.

17. The feeding mechanism according to claim 16, wherein the support plate is fixedly connected to the first slide base.

18. The feeding mechanism according to claim 16, wherein the cutter is fixedly arranged on the microtome, and the object carriage is configured to carry a specimen holder holding a specimen and move up and down in a vertical path of the microtome, to pass through the cutter from an upper position for one section.

19. A retraction device for a feeding mechanism of a rotary microtome, comprising:
a support plate;
a spindle movable along an axis direction thereof and having a first end penetrating the support plate, wherein the spindle moves relative to a cutter of the rotary microtome; and a plurality of spring washers fitted over the first end and compressed between the spindle and the support plate with a predetermined pre-load,
wherein the spindle is switchable between a first position in which the spindle is farthest from the support plate, and a second position in which the spindle is closest to the support plate; an inner ring of each of the plurality of spring washers has an identical protruding direction, wherein a plane bearing is disposed between the plurality of spring washers and the support plate; and the plane bearing is fitted over the first end of the spindle through a spindle sleeve.

20. The retraction device according to claim 19, wherein the cutter is fixedly arranged on the microtome; and the microtome further comprises an object carriage configured to carry a specimen holder holding a specimen and move up and down in a vertical path of the microtome, to pass through the cutter from an upper position for one section,
wherein the retraction device is connected to the object carriage, and configured to drive the object carriage to retract the predetermined distance in the axis direction of the spindle.

* * * * *